United States Patent
Paulson et al.

(10) Patent No.: US 9,703,010 B2
(45) Date of Patent: Jul. 11, 2017

(54) ARTICLES WITH ANTI-REFLECTIVE HIGH-HARDNESS COATINGS AND RELATED METHODS

(71) Applicant: CORNING INCORPORATED, Corning, NY (US)

(72) Inventors: Charles Andrew Paulson, Painted Post, NY (US); Darwin Gene Enicks, O'Fallon, MO (US); Jean-Francois Oudard, Webster, NY (US); James Joseph Price, Corning, NY (US); Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 218 days.

(21) Appl. No.: 14/174,993

(22) Filed: Feb. 7, 2014

(65) Prior Publication Data

US 2014/0362444 A1   Dec. 11, 2014

Related U.S. Application Data

(60) Provisional application No. 61/762,491, filed on Feb. 8, 2013.

(51) Int. Cl.
 *B32B 7/12* (2006.01)
 *G02B 1/10* (2015.01)
 (Continued)

(52) U.S. Cl.
 CPC ............. *G02B 1/105* (2013.01); *C09D 5/006* (2013.01); *G02B 1/115* (2013.01); *G02B 1/14* (2015.01);
 (Continued)

(58) Field of Classification Search
 None
 See application file for complete search history.

(56) References Cited

U.S. PATENT DOCUMENTS

| 5,108,843 | A | * | 4/1992 | Ohtaka | ............... H01L 21/2022 257/912 |
| 5,245,468 | A | | 9/1993 | Demiryont et al. | .......... 359/359 |

(Continued)

FOREIGN PATENT DOCUMENTS

| CN | 1160273 C | 8/2004 | ................ B60J 1/00 |
| CN | 1195694 C | 4/2005 | ............. C03C 17/34 |

(Continued)

OTHER PUBLICATIONS

J. Wojcik et al., "Characterization of Silicon Oxynitride Thin Films Deposited by ECR-PECVD," Electrochemical Society Proceedings, vol. 2001-7, pp. 206-209. Published 2001.*

(Continued)

*Primary Examiner* — David Sample
*Assistant Examiner* — Nicole T Gugliotta
(74) *Attorney, Agent, or Firm* — Payal A. Patel; Jeffrey A. Schmidt

(57) ABSTRACT

Methods and articles are provide for: a substrate having first and second opposing surfaces; an intermediate layer substantially covering the first surface of the substrate, the intermediate layer being between about 1-5 microns in thickness and having a hardness of at least 15 GPa; a first outer layer substantially covering the intermediate layer; and a second outer layer substantially covering the first outer layer, and having a hardness of at least 15 GPa.

16 Claims, 5 Drawing Sheets

(51) Int. Cl.
*B05D 5/06* (2006.01)
*C09D 5/00* (2006.01)
*G02B 1/115* (2015.01)
*G02B 1/14* (2015.01)

(52) U.S. Cl.
CPC ............... *Y10T 428/24975* (2015.01); *Y10T 428/24983* (2015.01); *Y10T 428/265* (2015.01)

(56) References Cited

U.S. PATENT DOCUMENTS

| | | | |
|---|---|---|---|
| 5,492,769 A | 2/1996 | Pryor et al. | 428/552 |
| 6,114,043 A | 9/2000 | Joret | 428/428 |
| RE37,294 E | 7/2001 | Knapp et al. | 427/534 |
| 6,830,817 B2 * | 12/2004 | Stachowiak | C03C 17/36 428/426 |
| 6,942,920 B2 | 9/2005 | Carre et al. | 428/408 |
| 7,772,089 B2 * | 8/2010 | Tanaka | H01L 21/76254 257/E21.122 |
| 7,903,338 B1 * | 3/2011 | Wach | A61B 5/0084 359/588 |
| 2008/0196626 A1 | 8/2008 | Wu et al. | 106/287.34 |
| 2009/0047504 A1 | 2/2009 | Wu et al. | 428/331 |
| 2009/0324844 A1 | 12/2009 | Haoto et al. | 427/527 |
| 2010/0215950 A1 | 8/2010 | Schultz et al. | 428/336 |
| 2010/0304090 A1 | 12/2010 | Henn et al. | 428/172 |

FOREIGN PATENT DOCUMENTS

| | | | |
|---|---|---|---|
| CN | 200987183 Y | 12/2007 | H04M 1/02 |
| CN | 10047191985 C | 3/2009 | C23C 14/24 |
| JP | 2009186760 A | 8/2009 | G02B 1/10 |
| KR | 670896 B1 | 1/2007 | G02B 5/30 |
| KR | 2012109646 A | 10/2012 | G06F 3/044 |
| RU | 2466948 C2 | 11/2012 | C03C 17/30 |
| WO | WO9956178 | 11/1999 | G03F 7/11 |
| WO | 03068501 A1 | 8/2003 | B32B 17/10 |
| WO | 2012177563 A2 | 12/2012 | C03C 17/34 |

OTHER PUBLICATIONS

Ferdinand Trier, The Glass Surface and Ways of Its Modification, Munich University of Applied Science, Germany, Ulrich Ranke, Onno Print GmbH, Germany.

Parimal J. Patel, Jeffrey J. Swab, Mark Staley, and George D. Quinn, Indentation Size Effect (ISE) of Transparent AlON and MgAl2O4, Army Research Laboratory, Aberdeen Proving Ground, MD 21005-5069, Jul. 2006, ARL-TR-3852.

Patent Cooperation Treaty International Notification of Transmittal of the International Search Report and the Written Opinion of the International Searching Authority, international application No. PCT/2014/015217: mailing date Jul. 22, 2014, 10 pages.

* cited by examiner

ARTICLES WITH ANTI-REFLECTIVE HIGH-HARDNESS COATINGS AND RELATED METHODS

CROSS-REFERENCE TO RELATED APPLICATIONS

This application claims the benefit of priority under 35 U.S.C. §119 of U.S. Provisional Application Ser. No. 61/762,491 filed on Feb. 8, 2013 the content of which is relied upon and incorporated herein by reference in its entirety.

BACKGROUND

The present disclosure relates to articles exhibiting high hardness and including anti-reflective coatings on substrates, and methods for achieving such high hardness.

Many consumer and commercial products employ a sheet of high-quality cover glass to protect critical devices within the product, provide a user interface for input and/or display, and/or many other functions. For example, mobile devices, such as smart phones, mp3 players, computer tablets, etc., often employ one or more sheets of high strength glass on the product to both protect the product and achieve the aforementioned user interface. In such applications, as well as others, the glass is preferably durable (e.g., scratch resistant and fracture resistant), transparent, and/or antireflective. Indeed, in a smart phone and/or tablet application, the cover glass is often the primary interface for user input and display, which means that the cover glass would preferably exhibit high durability and high optical performance characteristics.

Among the evidence that the cover glass on a product may manifest exposure to harsh operating conditions, scratches are probably the most common. Such evidence suggests that sharp contact, single-event damage is the primary source of visible scratches on cover glass in mobile products. Once a significant scratch mars the cover glass of a user input/display element, the appearance of the product is degraded and the resultant increase in light scattering may cause significant reduction in brightness, clarity and contrast of images on the display. Significant scratches can also affect the accuracy and reliability of touch sensitive displays. As a single severe scratch, and/or a number of moderate scratches, are both unsightly and can significantly affect product performance, they are often the leading complaint of customers, especially for mobile devices such as smart phones and/or tablets.

Accordingly, there are needs in the art for new articles exhibiting high hardness and low reflectivity and methods for forming such articles.

SUMMARY

In general, harder surfaces exhibit better scratch resistance as compared with softer surfaces. However, a given substrate composition employed to achieve certain strength and optical characteristics for a particular application may not exhibit a desired level of hardness, and therefore a desired level of scratch resistance.

For example, an oxide glass, such as Gorilla® Glass, which is available from Corning Incorporated, has been widely used in consumer electronics products. Such glass is used in applications where the strength of conventional glass is insufficient to achieve desired performance levels. Gorilla® Glass is manufactured by chemical strengthening (ion exchange) in order to achieve high levels of strength while maintaining desirable optical characteristics (such as high transmission, low reflectivity, and suitable refractive index). Glass compositions that are suitable for ion-exchange include alkali aluminosilicate glasses or alkali aluminoborosilicate glasses (e.g., containing at least 2-4 mol % of $Al_2O_3$ or $ZrO_2$), although other glass compositions are possible. Ion exchange (IX) techniques can produce high levels of compressive stress in the treated glass, as high as about −400 to −1000 MPa at the surface, and are suitable for thin glass substrates. In addition, the ion-exchange depth of layer may be in the range of about 15-50 microns.

While Gorilla® Glass exhibits very desirable strength properties, the hardness of such glass is in the range of about 6 to 10 GPa. A more desirable hardness for many applications is on the order of about 15 GPa and higher. It is noted that for purposes herein, the term "hardness" is intended to refer to the Berkovich hardness test, which is measured in GPa and employs a nano-indenter tip used for testing the indentation hardness of a material. The tip is a three-sided pyramid which is geometrically self-similar, having a relatively flat profile, with a total included angle of 142.3 degrees and a half angle of 65.35 degrees (measured from the main axis to one of the pyramid flats).

One approach to increasing the hardness of a given substrate, whether glass or otherwise, is to apply a film coating or layer to the substrate to produce a composite structure that exhibits a higher hardness as compared to the bare substrate. For example, a diamond-like carbon coating may be applied to a substrate to improve hardness characteristics of the composite structure. Indeed, diamond exhibits a hardness of 100 GPa; however, even when used on inexpensive glass substrates (such as for supermarket scanner windows and/or signature screens) the overall cost is driven by the high cost of the diamond-like material.

While the addition of a coating atop a substrate may overcome inherent limitations of a given substrate material, and improve the hardness of the structure, the coating may degrade other characteristics of the substrate, such as the strength of the substrate and/or other optical characteristics thereof. Application of certain coatings to certain glass substrates may improve the hardness characteristics of the structure; however, it has been discovered that the coating may nevertheless adversely affect the refractive index and reflectivity characteristics of the structure.

It has been discovered, however, that through proper consideration of certain parameters of the coating process, such as the chemical composition, layer thickness, number of layers, and variations thereof in a multi-layer structure, results in very satisfactory hardness and optical characteristics.

By way of example, a desirable scratch resistant coating on Gorilla® glass is thin, of high hardness (greater than about 15 GPa), anti-reflective, durable (e.g., resistant to delamination), controlled refractive index (to avoid reflection of light), and optically clear (exhibiting high transmission and little or no coloration). In accordance with one or more embodiments herein, the above characteristics may be accomplished, for example, by depositing a plurality of layers, such as oxides, nitrides and/or carbides, where at least one and preferably more than one instance exists of adjacent layers being of differing chemical compositions (e.g., exhibiting some variation in oxygen and/or nitrogen) and/or differing thicknesses to reach a specific hardness and refractive index in each layer, and in the overall structure.

Other aspects, features, and advantages will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

DETAILED DESCRIPTION OF THE PREFERRED EMBODIMENTS

Various embodiments disclosed herein are directed to articles exhibiting improved hardness that include a substrate, such as a glass substrate, and a plurality of coatings (or layers), each with specific properties, disposed on the substrate. Such layers increase the hardness of the substrate surface (and therefore the scratch resistance), while also achieving certain desirable optical properties, such as anti-reflectivity, resistance to delamination, controlled refractive index, and optical clarity (high transmission and little or no coloration). As will be developed more fully below, one or more embodiments may include such layers, where each layer has a specific chemical composition, mechanical properties, optical properties, and/or layer thickness, such that the number of layers and the order of each in relation to the others results in very satisfactory hardness and optical characteristics for the overall structure.

Experimentation and Theory Regarding Single Layers

Figure 1:
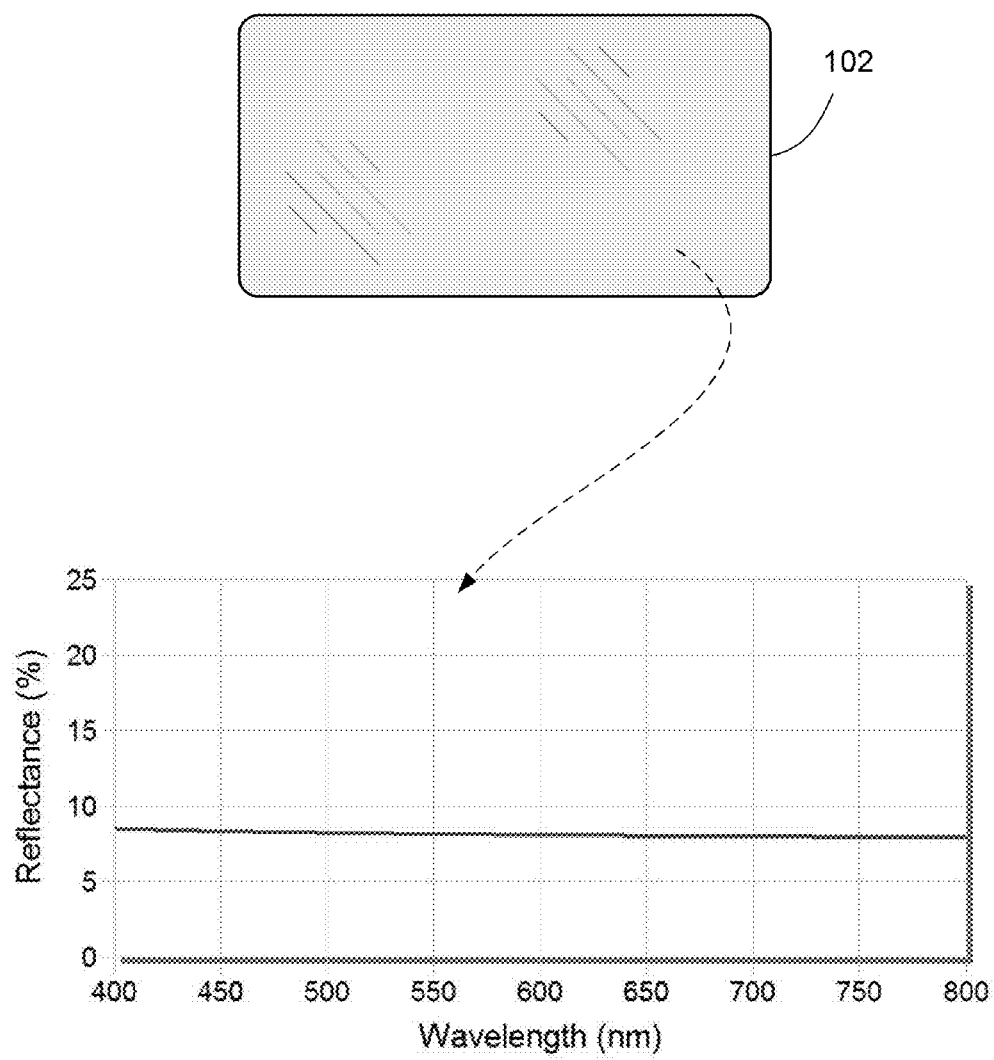
FIG. 1 is a schematic view of an uncoated glass substrate and a graphical illustration of the total reflectance (expressed as a percentage) of such glass substrate over a range of wavelengths.

In order to provide a fuller understanding of how the discoveries herein were achieved, and therefore the broad scope of the contemplated embodiments, a discussion of certain experimentation and theory will be provided. With reference to FIG. 1, a substrate 102 of interest, but not of limitation, was chosen for evaluation and development of novel processes and structures to improve the mechanical and optical properties of the bare substrate 102. The chosen substrate material was glass, specifically Gorilla® Glass from Corning Incorporated, which is an ion-exchange glass, usually an alkali aluminosilicate glass or alkali alumino-borosilicate glass, although other glass compositions are possible. Those skilled in the art will appreciate that the specific substrate material is not limited to glass, or Gorilla® Glass in particular, however, such material was selected for experimentation and example.

The bare substrate 102 was tested for hardness (which was about 7 GPa), refractive index (which was about 1.5), and total reflectance (which averaged 8.2%). FIG. 1 includes a graphical illustration of the total reflectance (expressed as a percentage) of the substrate 102 over a range of visible wavelengths. It is noted that for the purposes herein, total reflectance is an average that includes both the reflectance of any layer(s) and a backside reflectance of the substrate 102. While the substrate 102 exhibited a hardness of 7 GPa, a more desirable hardness for many applications is on the order of at least about 13 GPa, or alternatively at least 15 GPa and higher, and a more desirable total reflectance is about 6% or less.

Figure 2:
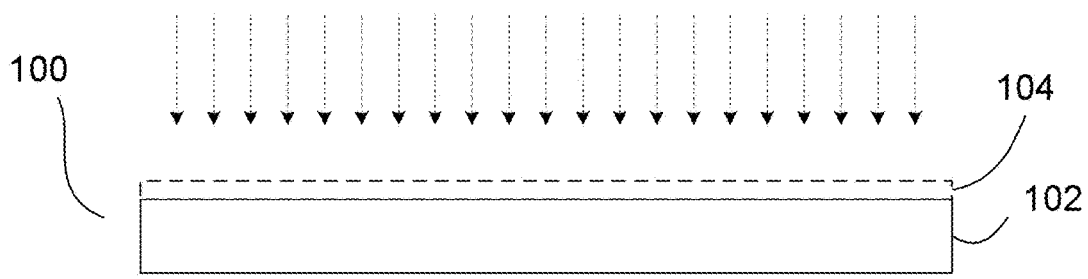
FIG. 2 is a schematic view of the glass substrate being subject to a coating process in order to form at least one layer thereon and alter both the hardness of the glass substrate and at least the total reflectance thereof.

With reference to FIG. 2, some baseline measurements were taken to evaluate the mechanical and optical effects of applying certain coatings 104 to the substrate 102. Specifically, FIG. 2 is a schematic view of a glass substrate 102 being subject to a coating process in order to form at least one layer 104 thereon and to alter both the hardness of the substrate 102 and at least the reflectance thereof. The specific mechanisms for achieving such alteration, the available variables in the manufacturing process, and the structural and optical details of the resultant combination 100 will be discussed in more detail later herein.

A number of substrate 102 samples were pre-treated to receive the layer 104, for example by acid polishing or otherwise treating the substrates 102 to remove or reduce the adverse effects of surface flaws. The substrates 102 were cleaned or pre-treated to promote adhesion of the applied layer 104. The respective layers 104 (which are discussed in more detail below) were applied to the substrate samples 102 via vapor deposition techniques, which may include sputtering, plasma enhanced chemical vapor deposition (PECVD), or evaporation beam (E-beam) techniques. The typical thickness of the layers 104 was about 1 micron. It is noted that additional samples were prepared with thicknesses of 2 microns and 3 microns, which yielded even better hardness results; however, such thicknesses are more difficult or costly to manufacture so a trade-off exists. Those skilled in the art will appreciate, however, that the particular mechanism by which the layers 104 are applied is not strictly limited to the aforementioned techniques, but rather may be selected by the artisan in order to address the exigencies of a particular product application or manufacturing goal.

For purposes of establishing the baseline, the chosen materials for forming the layers 104 for evaluation were silicon nitride and silicon oxynitride. Silicon nitride is a hard ceramic having high strength over a broad temperature range, moderate thermal conductivity, low coefficient of thermal expansion, moderately high elastic modulus, and unusually high fracture toughness for a ceramic. There are several known silicon nitride phases, each having a chemical formula corresponding to varying ratios of nitridation to Si oxidation. Of these phases, $Si_3N_4$ (trisilicon tetranitride) is considered to be the most chemically inert (being decomposed by dilute HF and hot $H_2SO_4$), and the most thermodynamically stable. Si3N4 is produced when powdered silicon is heated between 1300° C. and 1400° C. in an atmosphere of nitrogen. When the phrase "silicon nitride" is used, it is generally understood to mean the Si3N4 phase. Silicon oxynitride is also a ceramic material with the chemical formula SiOxNy. In amorphous forms, the composition of SiOxNy can vary between SiO2 (silica), which contains essentially no nitrogen, to Si3N4 (trisilicon tetranitride), which contains a substantial percentage of nitrogen.

Figure 3:
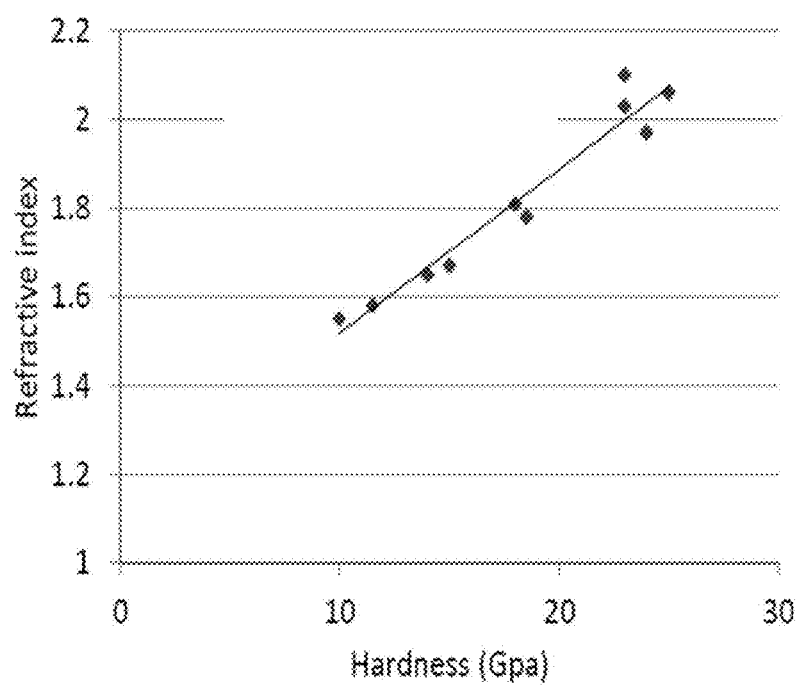
FIG. 3 is plot of refractive index versus hardness as the hardness of a coating increases on a glass substrate, which indicates a linear relationship therebetween.

In terms of characterizing the resultant mechanical and optical properties of the composite structure 100, reference is made to FIG. 3, which is plot of refractive index (on the ordinate) versus hardness in units of GPa (on the abscissa). As is readily apparent in the plot, there is a linear relationship between the resultant refractive index and coating hardness as the nitrogen content of the silicon nitride layer 104 is increased. Thus, the lower left data point (of hardness about 10 GPa and refractive index 1.5) is for a layer 104 of essentially no nitrogen, i.e., SiO2 silica (quartz), while the upper right data point is (of hardness 25 GPa and refractive index 2.04) is for a layer 104 of Si3N4 (trisilicon tetranitride). Layers 104 of varying composition were applied to the substrate 102 samples in order to evaluate and develop the novel embodiments herein.

Figure 4:
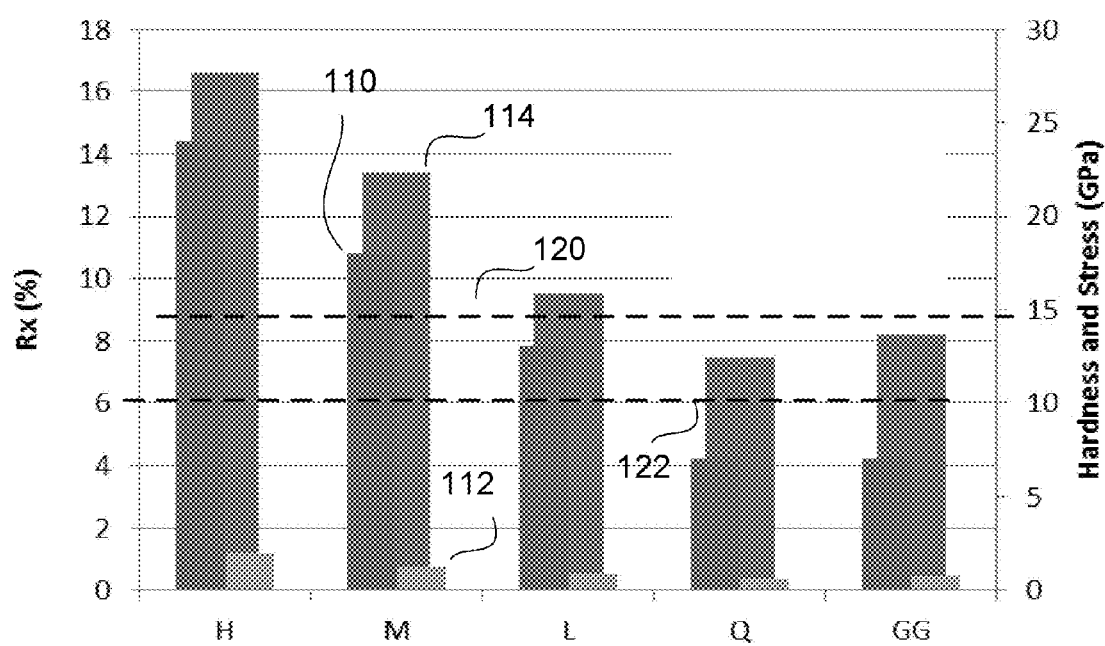
FIG. 4 is a graphical and tabular representation of total reflectance (expressed as a percentage), hardness, and film stress of respective coated glass substrates (and one uncoated glass substrate), each coating having a different chemical composition.

FIG. 4 is a graphical and tabular representation of the mechanical and optical properties of the resulting composite structures 100, including hardness 110 (in units of GPa), film stress 112 (in units of GPa), and total reflectance 114 (expressed as a percentage). For comparison purposes, the mechanical and optical properties of a bare glass (GG) substrate 102 are also shown. A desirable hardness (see line 120) is about 13 GPa, and more preferred about 15 GPa or greater, while the a desirable total reflection (see line 122) is about 10% or less, and more preferably about 6% or less.

The left-most trio of data (labeled H) are for a composite structure 100 having a glass substrate 102 coated with a single 2-micron layer 104 of Si3N4. The data are labeled H, representing a layer 104 having a chemical composition yielding relatively high (H) hardness and/or relatively high (H) refractive index. Such characteristics may be obtained by controlling the quantity of nitrogen and oxygen in the composition. For example, such high (H) characteristics may be obtained by controlling the atomic percentage of nitrogen to be greater than about 80% (where, % oxygen+% nitrogen=100%). In the case of Si3N4 such a percentage of nitrogen clearly exists. The hardness 110 of the structure 100 was about 24 GPa, while the film stress 112 was also relatively high. The refractive index (not shown) was about 2.04 (at 550 nm), while the average total reflectance 114 was 16.6% (oscillating between a minimum of 7.9% and a maximum of 25.3%). While the H sample exhibited a desirable hardness level (so far as scratch resistance is concerned), the very high average and peak reflectance (well above the desired 6% level) would be problematic for certain applications where high reflectance is a concern.

The next trio of data (labeled M) are for a composite structure 100 having a glass substrate 102 coated with a single 2-micron layer 104 of SiOxNy. The data are labeled M, representing a layer 104 having a chemical composition yielding relatively medium (M) hardness and/or relatively medium (M) refractive index. Again, such characteristics may be obtained by controlling the quantity of nitrogen and oxygen in the composition. For example, such medium (M) characteristics may be obtained by controlling the atomic percentage of nitrogen relative to the sum of the atomic percentages of oxygen and nitrogen to be between about 40-80%, e.g., 40, 50, 60, 70 or 80% (where, % oxygen+% nitrogen=100%). The hardness 110 of the structure 100 was about 18 GPa, while the film stress 112 was also relatively moderate. The refractive index (not shown) was about 1.86 (at 550 nm), while the average total reflectance 114 was 13.4% (oscillating between a minimum of 7.9% and a maximum of 19.9%). The M sample also exhibited a desirable hardness level, however, the average and peak reflectance, although lower than the H sample, would still be problematic for applications where reflectance is a concern.

The next trio of data (labeled L) are for a composite structure 100 having a glass substrate 102 coated with a single 2-micron layer 104 of SiOxNy. The data are labeled L, representing a layer 104 having a chemical composition yielding relatively low (L) hardness and/or relatively low (L) refractive index. For example, such low (L) characteristics may be obtained by controlling the percentage of nitrogen to be between about 10-50% (where, % oxygen+% nitrogen=100%). The hardness 110 of the structure 100 was about 13 GPa, while the film stress 112 was also relatively moderate. The refractive index (not shown) was about 1.63 (at 550 nm), while the average total reflectance 114 was 9.5% (oscillating between a minimum of 7.9% and a maximum of 11.3%). The L sample exhibited a more desirable average reflectance (approaching the preferred 6% level), however, the hardness value was relatively low when considering scratch resistance and might not be satisfactory for some applications.

The next trio of data (labeled Q) are for a composite structure 100 having a glass substrate 102 coated with a single 2-micron layer 104 of SiO2 (i.e., essentially no nitrogen content). The data are labeled Q, representing a structure having a very low hardness layer 104. The hardness 110 was about 7 GPa, while the film stress 112 was also relatively low. The refractive index (not shown) was about 1.47 (at 550 nm), while the average total reflectance 114 was 7.5% (oscillating between a minimum of 6.9% and a maximum of 8.3%). The Q, sample, like the L sample, exhibited a desirable average reflectance, however, the hardness value was too low to contribute to significant scratch resistance.

The above data suggests that achieving simultaneous characteristics of high hardness and low total reflectance is not practical by way of a single layer 104 on a substrate 102. It has, however, been discovered through such experimentation and creativity that a multi-layer structure, if properly constructed, may yield both high hardness (scratch resistance) and low total reflectance.

Embodiments Employing Multiple Layers

Figure 5:
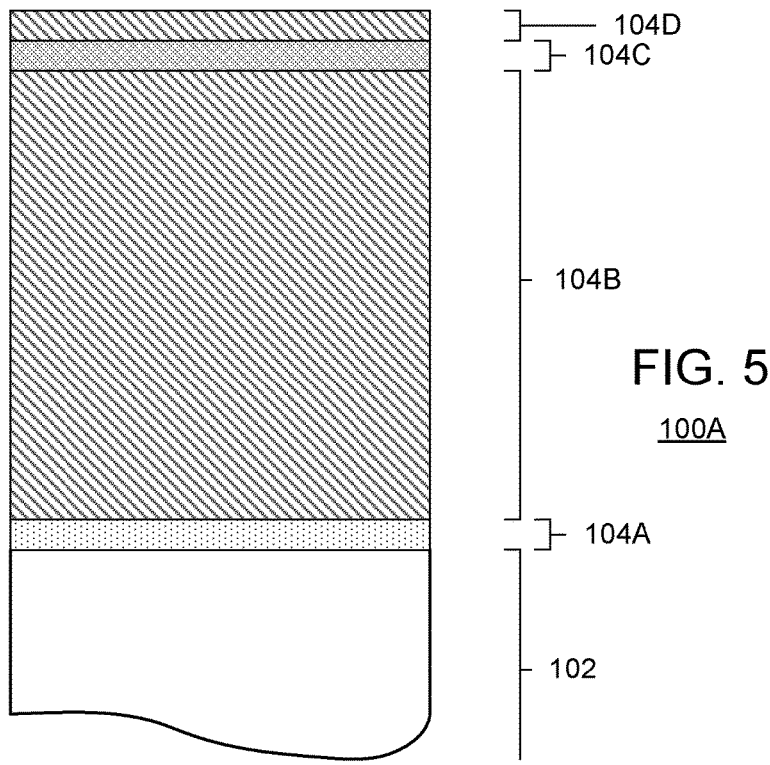
FIG. 5 is a schematic, side view of a coated glass substrate having a plurality of layers, at least some of such layers having differing chemical compositions, differing layer thicknesses, and/or other characteristics.

Reference is now made to FIG. 5, which is a schematic, side-view of an article 100A having a substrate 102 and a plurality of layers 104A, 104B, 104C, 104D, at least some of such layers having specific chemical compositions, specific refractive indices, specific layer hardness, specific layer thickness, and/or particular layer ordering to achieve desirable results. Although FIG. 5 shows article 100A as a layered structure, and the focus of the discussion will primarily be on the physical, chemical and optical properties thereof, those skilled in the art will appreciate from the disclosure herein that the details presented will also readily enable a skilled artisan to employ one or more methodologies for manufacturing such article 100A simply by applying well-known layering techniques to the situation.

In a broad aspect, the article 100A includes the substrate 102 having first and second opposing surfaces, an (optional but preferred) inner layer 104A substantially covering the substrate, and an intermediate layer 104B substantially covering the inner layer 104A (when employed) or substantially covering the first surface of the substrate 102 (when the inner layer is not employed). The article 100A further includes a first outer layer 104C substantially covering the intermediate layer 104B, and a second outer layer 104D substantially covering the first outer layer 104C. It is noted that the phrase "substantially covering" herein means that the superior layer (the layer covering) overlies the inferior layer either directly or indirectly through one or more further intermediate layers. In the embodiment illustrated in FIG. 5, there are no further intermediate layers shown between, for example, the inner layer 104A and the substrate 102, between the intermediate layer 104B and the inner layer 104A, between the first outer layer 104C and the intermediate layer 104B, etc., although such further intermediate layers are contemplated.

In contrast to the considerations given by those who have sought to reduce reflectivity alone, which suggests particular characteristics of a layered structure, there are some specific and unique relationships among the layers 104 of FIG. 5 (and other embodiments herein) that address both hardness and total reflectance of the of the article 100A.

Thickness of the Layers

One or more of these unique relationships concern the mechanical and optical characteristics of the intermediate layer 104B. In particular, the intermediate layer 104B is formed from a material having a relatively medium to high hardness, at least compared to the inner layer 104A (if employed) and the first outer layer 104C. Alternatively and/or additionally, such hardness may coexist with a relatively higher refractive index of the intermediate layer 104B, again as compared to the inner layer 104A and/or the first outer layer 104C. Alternatively and/or additionally, such hardness and/or refractive index may coexist with a significantly greater thickness as compared with the inner layer 104A and/or the first outer layer 104C.

In particular, the thickness of the intermediate layer 104B is preferably one of: (i) between about 1-5 microns in thickness, (ii) between about 1-4 microns in thickness, (iii) between about 2-3 microns in thickness, and (iv) about 2 microns. In general, the higher thicknesses are preferable owing to the higher resultant hardness characteristics; however, there is a cost in manufacturability. Through experimentation and creativity, a thickness of about 2 microns has been discovered to be a suitable thickness to have a significant effect on the overall hardness (and scratch resistance) of the article 100A, while maintaining reasonable manufacturing cost/complexity tradeoffs. Indeed, it has been discovered that when a relatively sharp object is applied to the article 100A (such as via a Berkovich test), the resultant stress fields from the sharp object may extend over the surface of the article 100A about hundred times the radius of the object. These stress fields may easily reach 1000 microns or more from the impact sight. Thus, the very significant thickness (1-5 microns) of the intermediate layer 104B is chosen to address and counter such far reaching stress fields and improve the scratch resistance of the overall article 100A. Notably, there is no consideration of such stress fields when applying coating techniques to address only reflectivity. Indeed, coating techniques to address reflectivity alone involve much lower thicknesses, at least a magnitude lower (e.g., thicknesses of about lambda/2 at a wavelength of interest).

In contrast, the respective thicknesses of the other layers 104 are remarkably different from the thickness of the intermediate layer 104B. For example, when the article 100A employs the inner layer 104A, the thickness of such layer is on the order of about lambda/4 (at a wavelength of interest). Assuming that the wavelengths of the visible light spectrum are of interest, then the thickness of the inner layer 104A is one of: (i) between about 40-200 nm, (ii) between about 50-150, (iii) 70-100 nm, and (iv) about 90 nm. The thickness of the first outer layer 104C may be on the order of about lambda/4, or preferably even thinner, such as one of: (i) between about 20-100 nm, (ii) between about 30-90, (iii) 40-80 nm, and (iv) about 50 nm. Finally, a thickness of the second outer layer 104D may also be on the order of about lambda/4, or preferably even thinner, such as is one of: (i) between about 20-100 nm, (ii) between about 30-90, (iii) 40-80 nm, and (iv) about 50 nm.

Hardness of the Layers

Another of the unique relationships of the properties of the layers 104 concerns the hardness of the intermediate layer 104B as compared with the other layers. For example, the hardness of the intermediate layer 104B may be one of: (i) at least 15 GPa, (ii) at least 18 GPa, and (iii) at least 20 GPa. It is noted that such hardness values would be far outside the consideration of an artisan seeking to address reflectivity concerns. Indeed, the hardness of applied layers for anti-reflectivity purposes is not a recognized concern in the anti-reflectivity arts. However, as with the thickness characteristic of the intermediate layer 104B, the significant level of hardness thereof is selected to specifically address and counteract the stress fields induced by an applied sharp object, thereby improving scratch resistance.

In comparison to the hardness of the intermediate layer 104B, however, the hardness of the inner layer 104A (if employed) is significantly lower, such as about 13 GPa or less. Similarly, the hardness of the first outer layer 104C is also significantly lower than that of the intermediate layer 104B, such as one of: (i) about 7 GPa or less, and (ii) about 10 GPa or less. As will be discussed in more detail below, the respective hardness of the inner layer 104A and first outer layer 104C, which sandwich the intermediate layer 104B, go hand in hand with respective refractive indices in order to tune the total reflectance of the article 100A to desirable levels.

Although one or more embodiments herein contemplate the possibility of omitting the second outer layer 104D, it is preferred that such layer be employed to provide some mechanical protection (e.g., against scratching) to the first outer layer 104C. Indeed, although the mechanical properties of the intermediate layer 104B provides a stiff backing to the first outer layer 104C, thereby improving scratch resistance of the article 100A (even without the second outer layer 104D), the hardness of the first outer layer 104C is nevertheless relatively low, and thereby may be prone to scratching under some circumstances. In this regard, it has been discovered that application of (even a relatively thin) second outer layer 104D, which is relatively hard, together with the intermediate layer 104B below, greatly improves the overall hardness (and scratch resistance) of the article 100A. In particular, the hardness of the second outer layer 104D is preferably one of: (i) at least 15 GPa, (ii) at least 18 GPa, and (iii) at least 20 GPa.

Refractive Indices of the Layers

Another of the unique relationships of the properties of the layers 104 concerns the refractive indices thereof, which as suggested earlier herein also have some relationship to the respective hardness values of the layers 104. Proper selection of the respective refractive indices of the layers 104 has been found to have a significant impact on, and significantly improves, the total reflectance of the article 100A, while simultaneously maintaining the overall hardness of the article 100A at desired levels. Indeed, the proper choices of refractive indices of the layers 104, especially the inner layer 104A and/or the first outer layer 104C (in the presence of the thick, high refractive index intermediate layer 104B) can move the total reflectance of the overall article 100A from an unacceptable level (e.g., well above 10%) to an acceptable level (e.g., below about 10%, preferably below about 8% or even below about 6%).

By way of example, the refractive indices of the respective layers 104 may be characterized in terms of the difference between the index in one layer versus another layer, especially the difference between the respective indices of adjacent layers. For example, it has been found that when the substrate 102 has a refractive index, Sref, the refractive index, Inref, of the inner layer 104A (when employed) should be less than about 0.4 higher (preferably less than about 0.2 or 0.1 higher) than the refractive index, Sref, of the substrate 102. In contrast, the refractive index, Ilref, of the intermediate layer 104B should be at least 0.2 higher (and preferably at least 0.3 higher) than the refractive index, Inref, of the inner layer 104A (when employed) and/or the refractive index, Sref, of the substrate 102. Further, the refractive index, FOref, of the first outer layer 104C should be at least 0.2 lower (and preferably at least 0.3 lower) than the refractive index, Ilref of the intermediate layer 104B. Finally, the refractive index, SOref, of the second outer layer 104D should be at least 0.2 higher (and preferably 0.3 higher) than the refractive index, FOref, of the first outer layer 104C.

By way of further example, the refractive indices of the respective layers 104 may be characterized in terms of acceptable ranges within each layer. For example, it has been found that when the refractive index, Sref, of the substrate 102 is between about 1.4-1.6, the refractive index, Inref, of the inner layer 104A (when employed) may be between about 1.4-1.8. The refractive index, Ilref, of the intermediate layer 104B may be one of: (i) between about 1.7-2.0, (ii) between about 1.9-2.1, and (iii) between about 2.1-2.4. The refractive index, FOref, of the first outer layer 104C may be between about 1.4-1.6. The refractive index, SOref, of the second outer layer 104D may be one of: (i) between about 1.7-2.0, and (ii) between about 1.9-2.1.

Materials of the Layers

The aforementioned relationships of the properties of the layers 104 may also be characterized in terms of specific materials and/or chemical compositions of the respective layers 104. Indeed, the desired simultaneous characteristics of high hardness and low total reflectance of the article 100A may be achieved by careful selection of particular materials and/or chemical compositions for the respective layers 104 (together with the aforementioned thicknesses).

Substrate Material and Characteristics

In the illustrated examples, the substrate 102 is substantially planar, although other embodiments may employ a curved or otherwise shaped or sculpted substrate 102. Additionally or alternatively, the thickness of the substrate 102 may vary, for aesthetic and/or functional reasons, such as employing a higher thickness at edges of the substrate 102 as compared with more central regions.

The substrate 102 may be formed of any suitable material, such as from at least one of quartz, glass, glass-ceramic, oxide glass, ion exchanged glass, polymer, combinations thereof, or other material(s).

When the substrate 102 is formed of glass or glass ceramic materials, then any suitable glass composition may be employed, such as soda lime glass (SiO2, Na2O, CaO, etc.), metallic alloy glasses, ionic melt glass, polymer glasses (acrylic glass, polycarbonate, polyethylene terephthalate), etc.

Ion Exchange Glass

In applications where the substrate 102 should exhibit high strength, the strength of conventional glass may be enhanced by chemical strengthening (ion exchange). Ion exchange (IX) techniques can produce high levels of compressive stress in the treated glass, as high as about −400 to −1000 MPa at the surface, and is suitable for very thin glass. One such IX glass is Corning Gorilla® Glass available from Corning Incorporated.

Ion exchange is carried out by immersion of a glass sheet into a molten salt bath for a predetermined period of time, where ions within the glass sheet at or near the surface thereof are exchanged for larger metal ions, for example, from the salt bath. By way of example, the molten salt bath may include KNO$_3$, the temperature of the molten salt bath may within the range of about 400-500° C., and the predetermined time period may be within the range of about 2-24 hours, and preferably between about 2-10 hours. The incorporation of the larger ions into the glass strengthens the sheet by creating a compressive stress in a near surface region. A corresponding tensile stress is induced within a central region of the glass sheet to balance the compressive stress. Sodium ions within the glass sheet may be replaced by potassium ions from the molten salt bath, though other alkali metal ions having a larger atomic radius, such as rubidium or cesium, may replace smaller alkali metal ions in the glass. According to particular embodiments, alkali metal ions in the glass sheet may be replaced by Ag+ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass sheet that results in a stress profile. The larger volume of the incoming ion produces a compressive stress (CS) on the surface and tension (central tension, or CT) in the center region of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of compressive layer. The depth of compressive layer will in some cases be greater than about 15 microns, and in some cases greater than 20 microns, to give the highest protection against surface damage.

Any number of specific glass compositions may be employed in producing the glass sheet. For example, ion-exchangeable glasses that are suitable for use in the embodiments herein include alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size.

Layer Materials

The material of the layers 104 may be taken from silicon nitrides, silicon oxy-carbides, aluminum oxy-nitrides, aluminum oxy-carbides, oxides such as Mg2AlO4, diamond like carbon film, ultra nanocrystalline diamond, or other materials. Preferred materials for implementing the layers 104 include silicon nitrides and silicon dioxide.

For example, assuming that the substrate 102 is formed from oxide glass, the inner layer 104A (when employed) may include SiOxNy, where the atomic percentage of nitrogen relative to the sum of the atomic percentages of oxygen and nitrogen is between about 10-50% (where % oxygen+% nitrogen=100%). As discussed above, this material chemical composition for the inner layer 104A exhibits a relatively low (L) hardness and relatively low (L) refractive index (as compared to the intermediate layer 104B). In addition, the refractive index of such material, while potentially higher than that of the substrate 102, is preferably closer to the refractive index of the substrate 102 than that of the intermediate layer 104B.

In contrast, the intermediate layer 104B may also include SiOxNy, but of a significantly differing composition, where the atomic percentage of nitrogen relative to the sum of the atomic percentages of oxygen and nitrogen is one of: (i) between about 40-80%, e.g., 40, 50, 60, 70 or 80%, and (ii) greater than about 80%, where % oxygen+% nitrogen=100%. Those skilled in the art will appreciate that such higher levels of nitrogen may actually involve the use of Si3N4. For the purposes herein, when the atomic percentage of nitrogen is between about 40-80%, then the resultant hardness and refractive index are moderate (M, or medium) as compared with the inner layer 104A and/or the substrate 102 (assuming that the substrate is oxide glass). Alternatively, when the atomic percentage of nitrogen relative to the sum of the atomic percentages of oxygen and nitrogen is greater than about 80%, then the resultant hardness and refractive index are high (H) as compared with the inner layer 104A and/or the substrate 102.

The material of the first outer layer 104C may include at least one of: (i) SiO2, and (ii) SiOxNy, where the percentage of nitrogen is less than about 10%. Of course, the refractive index (and hardness) of SiO2 is relatively low as compared to the intermediate layer 104B, and close to that of the substrate 102. Similarly, when the atomic percentage of nitrogen in SiOxNy is less than about 10%, the refractive index (and hardness) of such material is also relatively low (L) as compared to the intermediate layer 104B, and close to that of the substrate 102.

The material of the second outer layer 104D may also include SiOxNy (or Si3N4) where the atomic percentage of nitrogen relative to the sum of the atomic percentages of oxygen and nitrogen is one of: (i) between about 40-80%, e.g., 40, 50, 60, 70 or 80%, and (ii) greater than about 80% (again, where % oxygen+% nitrogen=100%). Thus, as was the case for the intermediate layer 104B, the material properties (e.g., the hardness and refractive index) of the second outer layer 104D are relatively high (H) as compared with other layers 104 and/or the substrate 102.

Alternating Layer Properties—General Result

The above discussion will reveal to the skilled artisan that the material properties of the respective layers 104 generally alternate from one layer to the next. For example, the inner layer 104A is of low (L) hardness and/or refractive index, the intermediate layer 104B is of medium (M) to high (H) hardness and/or refractive index, the first outer layer 104C is of low (L) hardness and/or refractive index, and the second outer layer 104D is of medium (M) to high (H) hardness and/or refractive index. Thus, the layers 104 may alternate in terms of such properties: L, M, L, M; or L, H, L, H; or combinations thereof. Still further, the first outer layer could also be closer to, or of, pure quartz (SiO2), denoted by Q. Thus, the layers could be L, M, Q, M; or L, H, Q, H; or combinations thereof.

Figure 6:
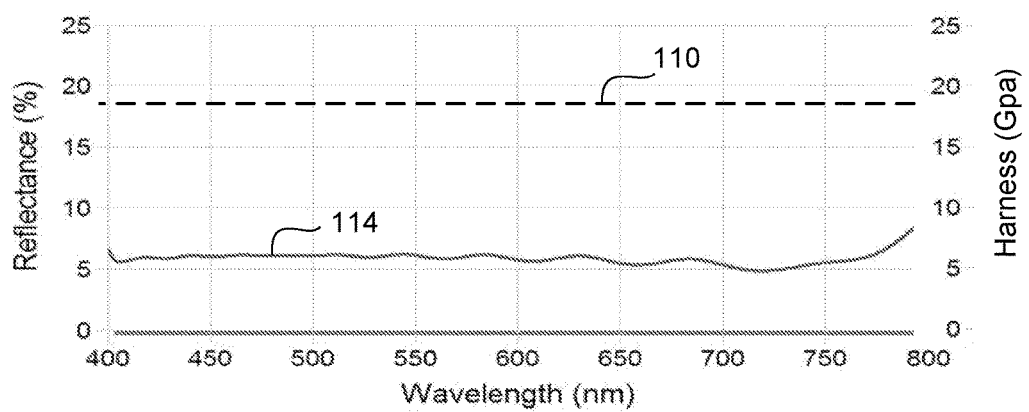
FIG. 6 is a graphical representation of total reflectance (expressed as a percentage) and hardness of a coated glass substrate having a plurality of layers in accordance with one or more embodiments herein, such as that of FIG. 5.

With reference to FIG. 6, a graphical representation of the total reflectance (expressed as a percentage) and hardness of the embodiments of the article 100A discussed above is shown. In particular, the hardness 110 of the article 100A is above 15 GPa, indeed approximately 18 GPa. Concurrently, the total reflectance 114 is less than about 6-70 on average over the visible wavelength range.

Intermediate Layer Having Sub-Layers

Figure 7:
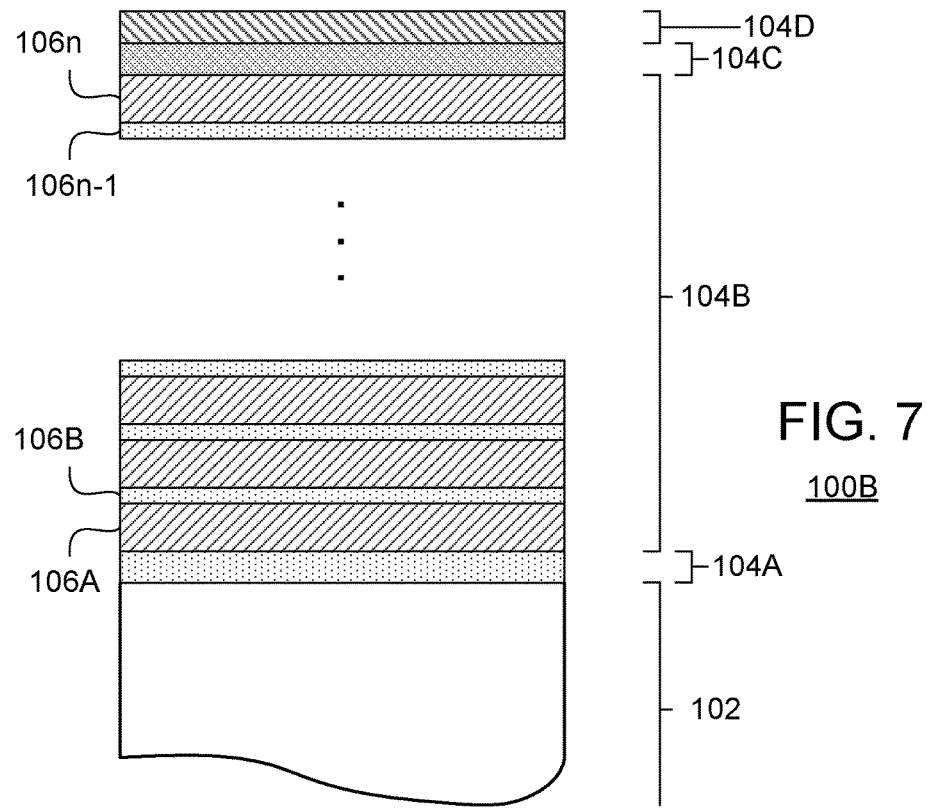
FIG. 7 is a schematic, side view of an alternative embodiment of the coated glass substrate of FIG. 5.

In accordance with one or more further embodiments herein, reference is made to FIG. 7, which is a schematic, side view of an alternative embodiment of an article 100B. In a number of respects, the details of the article 100B are the same or similar to those of the article 100A, including the variations, additions and alternatives previously discussed.

A notable difference, or at least a notable detail, that was not previously discussed is the fact that the intermediate layer 104B of the article 100B is shown with a plurality sub-layers 106A, 106B, etc. In a broad sense, the intermediate layer 104B of at least this embodiment includes at least two adjacent sub-layers 106A, 106B, where each such layer has at least one differing characteristic from the other.

For example, each adjacent sub-layer 106A, 106B may have a respective refractive index that differs by at least about 0.2 (or preferably by at least 0.3 or more) as compared with the other sub-layer.

As noted above, such differences in refractive index may be expressed additionally and/or alternatively in terms of ranges, such as the first sub-layer 106A having a refractive index, Fsref, of between about 1.7-2.0, and the second sub-layer having a refractive index, Ssref, of between about 1.5-1.8. Thus, the two adjacent sub-layers 106A, 106B may be characterized as being of medium (M) refractive index and low (L) refractive index, respectively. As will be evident to the skilled artisan, the properties of the respective layers 106A, 106B may alternatively be characterized by their respective hardness properties (e.g., M, L, respectively), and/or their respective material compositions, etc., all of which were discussed above with respect to the article 100A. In a preferred embodiment, the last sub-layer 106n, following the penultimate sub-layer 106n-1, and preceding the first outer layer 104C is of a higher refractive index (e.g., M).

Additionally and/or alternatively, in order to achieve the desired characteristics of the intermediate layer 104B in terms of improving the scratch resistance of the article 100B, it is preferred that the thickness of the layer 106B having the lower refractive index (and lower hardness) be relatively thinner as compared with the thickness of the layer 106A having the higher refractive index (and higher hardness). For example, in the embodiment at hand, the thickness of the first sub-layer 106A may be between about 30-400 nm, while the thickness of the second first sub-layer 106B may be between about 5-30 nm.

Additionally and/or alternatively, in various embodiments, the numbers of sub-layers 106 may be greater than two, such as one of: (i) at least 4 sub-layers; (ii) at least 8 sub-layers; (iii) at least 12 sub-layers; (iv) at least 16 sub-layers; and (v) at least 20 sub-layers.

In a further alternative embodiment, the first sub-layer 106A may have a refractive index, Fsref, of between about 1.9-2.1, and the second sub-layer 106B having a refractive index, Ssref, of between about 1.7-2.0. Thus, the two adjacent sub-layers 106A, 106B may be characterized as being of high (H) refractive index (and/or hardness) and medium (M) refractive index (and/or hardness), respectively.

Still further alternatives may include other alternating patterns of L, M, and/or H characteristics among the sub-layers 106. For example, at least some of the sub-layers may include at least one of the following patterns: (i) L, M; (ii) L, H; (iii) M, H; (iv) H, M, L; (v) L, M, H; (vi) H, L, M; (vii) M, L, H; (viii) L, H, M; and (ix) M, H, L.

In a further alternative embodiment, at least some of the layers 104, 106 may be constructed as a laminate substructure separate from the substrate 102. For example, some or all of the layers 104, 106 of FIG. 5 or FIG. 7 may be prepared separately from the substrate 102. Thereafter, the laminate substructure 104, 106 may be coupled to the glass substrate 102 using known techniques.

In a further alternative embodiment, the second outer layer 104D may be omitted. Although such may reduce the overall scratch resistance of the article 100A, 100B, the aforementioned properties of the intermediate layer 104B nevertheless contribute so significantly to the improved hardness and total reflectance properties of the article 100A, 100B that the omission of the second outer layer 104D is surprisingly a viable alternative.

In accordance with one or more further embodiments, the layers 104B, one or more of its sub-layers 106, and/or 104D could be formed from other materials, such as MgAl2O4, CaAl2O4, nearby compositions of MgAl2O(4−x) or CaAl2O(4−x) (where x is relatively small, i.e., 0≤x≤0.1), Mg(1−y)Al(2+y)O(4−x), and/or Ca(1−y)Al(2+y)O(4−x) (where y is also relatively small, i.e.,0≤y≤0.1). These materials permit decreased absorption in the thickest layer in the stack (e.g., layer 104B). Still further, other materials are also contemplated, for any layer in the aforementioned embodiments, including: SiOxCy, SiOxCyNz, Al, AN, AlNxOy, $Al_2O_3$, $Al_2O_3/SiO_2,B_4C_3$, BN, DLC, Graphene, SiCNx, SiNx, $SiO_2$, SiC, $SnO_2$, $SnO_2/SiO_2$, $Ta_3N_5$, $TiB_2$, TiC, TiN, $TiO_2$, $ZrO_2$ and/or other transition metal compounds such as transition metal borides, carbides, oxides and/or nitrides.

In accordance with one or more still further embodiments, the layers 104B, one or more of its sub-layers 106, and/or 104D could be water clear layers.

Examples

A number of samples of structures adhering to the general characteristics of article 100B were evaluated.

A first example included an ion exchanged glass substrate 102, followed by an inner layer 104A of 62.17L (meaning 62.17 nm thick of SiOxNy having L characteristics), followed by a sub-layered intermediate layer 104B of (using the same notation convention, including the potential of employing SiN4 for layers having H characteristics) 62.69M, 160.64M, 8.37M, 182.43H, 5.29M, 184.75H, 4.68M, 186.37H, 4.83M, 186.02H, 5.74M, 184.41H, 7.69M, 181.1H, 12.44M, 170.34H, 27.03M, 146.66H, followed by a first outer layer 104C of 90.05Q (meaning 90.05 nm thick SiO2 quartz, Q). The article 100B exhibited a hardness of about 18 GPa and an average total reflectance of about 5.1% (over the visible wavelength spectrum).

Another example included an ion exchanged glass substrate 102, followed by an inner layer 104A of 70.97L, followed by a sub-layered intermediate layer 104B of 65.79M, 161.15H, 7.72M, 184.4H, 5.34M, 185.31H, 5.32M, 185.36H, 6.05M, 183.82H, 7.46M, 181.45H, 9.73M, 178.41H, 14.35M, 169.94H, 26.61M, 150.81H, followed by a first outer layer 104C of 21.52Q, and lastly a second outer layer 104D of 5H. The article 100B exhibited a hardness of about 18 GPa and an average total reflectance of about 5.8% (over the visible wavelength spectrum).

Another example included an ion exchanged glass substrate 102, followed by an inner layer 104A of 81.28L, followed by a sub-layered intermediate layer 104B of 164.86M, 10L, 295.05M, 10L, 190.26M, 10L, 191.53M, 10L, 197.86M, 5L, 194.72M, 10L, 415.16M, 10L, 193.5M, 10L, 189.3M, 19.85L, 167.06M, followed by a first outer layer 104C of 92.01Q, and optionally a second outer layer 104D of relatively thin H characteristic material. The article 100B exhibited a hardness of about 18 GPa and an average total reflectance of about 5.5% (over the visible wavelength spectrum).

Another example included an ion exchanged glass substrate 102, (without an inner layer 104A of L characteristic material), followed by a sub-layered intermediate layer 104B of 164.45M, 10L, 290.53M, 10L, 198.51M, 10L, 188.36M, 10L, 203.28M, 5L, 194.9M, 10L, 415.31M, 10L, 193.14M, 10L, 187.04M, 22.87L, 165.8M, followed by a first outer layer 104C of 91.06Q, and optionally a second outer layer 104D of relatively thin H characteristic material. The article 100B exhibited a hardness of about 18 GPa and an average total reflectance of about 6.2% (over the visible wavelength spectrum).

Another example included an ion exchanged glass substrate 102, followed by an inner layer 104A of L characteristic material, followed by a sub-layered intermediate layer 104B of alternating X characteristic (i.e., between M-H characteristics, refractive index about 1.96) and L characteristics: 165.89X, 10L, 192.56X, 10L, 189.15X, 10L, 191.04X, 10L, 190.65X, 10L, 191.02X, 10L, 191.43X, 10L, 186.82X, 10L, 198.47X, 15.92L, 161.96X, followed by a first outer layer 104C of 90.95Q. The article 100B exhibited a hardness of about 18 GPa and an average total reflectance of about 5.5% (over the visible wavelength spectrum).

Ultra-hard Intermediate Layer

In one or more further alternative embodiments, the intermediate layer 104B (whether of a single layer or multiple sub-layers) include an extremely hard, high refractive index material. For example, the intermediate layer 104B may have a refractive index in the range of 1.4-2.2, 2.0-3.0, 2.1-2.4, 2.4-3.0, 2.3-10, etc. Additionally and/or alternatively, the intermediate layer 104B may have a hardness of, for example, 15 to 25 GPa, 25 to 50 GPa, over 50 GPa. An intermediate layer 104B including a diamond material may exhibit some such properties. It has been discovered that when the intermediate layer 104B is of very high hardness and/or refractive index, the first and/or second outer layers 104C, 104D may also be of even higher hardness and/or refractive index (as compared with the embodiments discussed above). For example, in such embodiments the first outer layer 104C, instead of being of L characteristics, could instead be of M or H characteristics, so long as the refractive index thereof were less than that of the intermediate layer 104B by at least 0.2, but preferably by at least 0.3. The second outer layer 104D could be of M or H characteristics as well. Additionally and/or alternatively, the hardness of the first outer layer 104C and/or the second outer layer 104D may be between about 10-20 GPa, or between about 15-25 GPa. Such high hardness and/or refractive index layers have not been considered by previous designers of anti-reflective stacks, owing to their high associated reflectivity.

Figure 8:
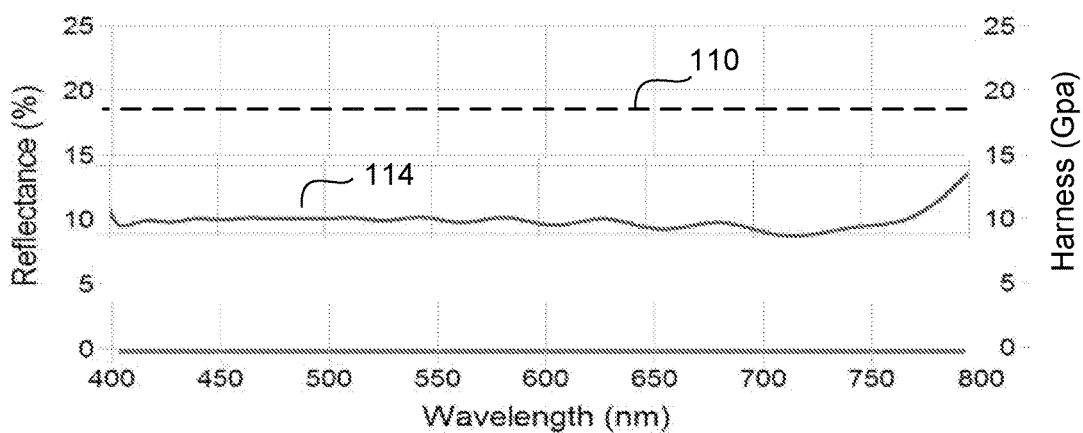
FIG. 8 is a graphical representation of total reflectance (expressed as a percentage) and hardness of a coated glass substrate having a plurality of layers in accordance with one or more embodiments herein.

With reference to FIG. 8, even with the very hard, high refractive index material used for the intermediate layer 104B, it has been discovered that such an arrangement can nevertheless exhibit high hardness 110 (well above 15 GPa) concurrently with a total reflectance 114 of about 10% on average over the visible wavelength range.

As used herein, the singular forms "a," "an" and "the" include plural referents unless the context clearly dictates otherwise. Thus, for example, reference to a "layer" includes examples having two or more such "layers" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an article that comprises one or more layers includes embodiments where the article consists of such layers and embodiments where a glass substrate consists essentially of such layers.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the application.

invention claimed is:

1. An article, comprising:
    a substrate having first and second opposing surfaces;
    an intermediate layer substantially covering the first surface of the substrate, and having a thickness of between about 1-5 microns, a hardness of at least 15 GPa, and a refractive index higher than the substrate;
    a first outer layer in contact with and substantially covering the intermediate layer, and having a refractive index lower than the intermediate layer; and
    a second outer layer in contact with and substantially covering the first outer layer, the second outer layer being an outermost layer of the article, and having a hardness of at least 15 GPa and a refractive index higher than the first outer layer.

2. The article of claim 1, wherein at least one of:
    the article further comprises an inner layer in contact with and substantially covering the first surface of the substrate and in contact with and being substantially covered by the intermediate layer;
    the substrate has a refractive index, Sref;
    the inner layer has a refractive index, Inref, of less than about 0.4 higher than the refractive index, Sref, of the substrate;
    the intermediate layer has a refractive index, Ilref, at least 0.2 higher than at least one of: (i) the refractive index, Inref, of the inner layer, and (ii) the refractive index, Sref, of the substrate;
    the first outer layer has a refractive index, FOref, of at least 0.2 lower than the refractive index, Ilref of the intermediate layer; and
    the second outer layer has a refractive index, SOref, of at least 0.2 higher than the refractive index, FOref, of the first outer layer.

3. The article of claim 2, wherein at least one of:
    the refractive index, Sref, of the substrate is between about 1.4-1.6;
    the refractive index, Inref, of the inner layer is between about 1.4-1.8;
    the refractive index, Ilref, of the intermediate layer is one of: between about 1.7-1.9, between about 1.9-2.1, between about 2.1-2.4, between about 1.4-2.2, between about 2.0-3.0, between about 2.4-3.0, between about 2.3-10;
    the refractive index, FOref, of the first outer layer is one of: between about 1.4-1.6, between about 1.6-1.8, and between about 1.8-2.0;
    the refractive index, SOref, of the second outer layer is one of: between about 1.7-1.9, between about 1.9-2.1, and between about 2.1-2.4.

4. The article of claim 1, wherein at least one of:
    the article further comprises an inner layer substantially covering the first surface of the substrate and being disposed between the substrate and the intermediate layer;
    a hardness of the inner layer is about 13 GPa or less;
    the hardness of the intermediate layer is one of: (i) at least 15 GPa, (ii) at least 18 GPa, (iii) at least 20 GPa, (iv) between about 15 to 25 GPa, (v) between about 25 to 50 GPa, and (vi) over 50 GPa;
    a hardness of the first outer layer is one of: (i) about 7 GPa or less, and (ii) about 10 GPa or less; and
    the hardness of the second outer layer is one of: (i) at least 15 GPa, (ii) at least 18 GPa, (iii) at least 20 GPa, (iv) between about 10 to 20 GPa, (v) between about 15 to 25 GPa.

5. The article of claim 1, wherein at least one of:
    the article further comprises an inner layer substantially covering the first surface of the substrate and being disposed between the substrate and the intermediate layer;
    a thickness of the inner layer is one of: (i) between about 40-200 nm, (ii) between about 50 -150, (iii) 70 -100 nm, and (iv) about 90 nm;
    the thickness of the intermediate layer is one of : (i) between about 1-5 microns, (ii) between about 1-4 microns, (iii) between about 2-3 microns, and (iv) about 2 microns;
    a thickness of the first outer layer is one of: (i) between about 20-100 nm, (ii) between about 30-90, (iii) 40-80 nm, and (iv) about 50 nm; and
    a thickness of the second outer layer is one of: (i) between about 20-100 nm, (ii) between about 30-90, (iii) 40-80 nm, and (iv) about 50 nm.

6. The article of claim 1, wherein at least one of:
the substrate is formed from at least one of quartz, glass, glass-ceramic, oxide glass, ion exchanged glass, polymer, and combinations thereof;
the article further comprises an inner layer substantially covering the first surface of the substrate and being disposed between the substrate and the intermediate layer;
the inner layer includes SiOxNy, where the atomic percentage of nitrogen relative to the sum of the atomic percentages of oxygen and nitrogen is between about 10-50%;
the intermediate layer includes SiOxNy, where the atomic percentage of nitrogen relative to the sum of the atomic percentages of oxygen and nitrogen is one of: (i) between about 40-80%, and (ii) greater than about 80%,
the first outer layer includes at least one of: (i) SiO2, and (ii) SiOxNy, where the atomic percentage of nitrogen relative to the sum of the atomic percentages of oxygen and nitrogen is less than about 20%; and
the second outer layer includes SiOxNy, where the atomic percentage of nitrogen relative to the sum of the atomic percentages of oxygen and nitrogen is one of: (i) between about 40-80%, and (ii) greater than about 80%.

7. The article of claim 1, wherein the intermediate layer includes at least two sub-layers.

8. The article of claim 7, wherein each sub-layer has a respective refractive index that differs by at least about 0.2 as compared with an adjacent sub-layer.

9. The article of claim 7, wherein the at least two sub-layers include alternating first and second sub-layers, the first sub-layer having a refractive index, Fsref, of between about 1.5-1.8, and the second sub-layer having a refractive index, Ssref, of between about 1.7-2.0.

10. The article of claim 9, wherein a thickness of the first sub-layer is between about 5-30 nm, and a thickness of the second sub-layer is between about 30-400 nm.

11. The apparatus of claim 9, further comprising one of: (i) at least 4 sub-layers; (ii) at least 8 sub-layers; (iii) at least 12 sub-layers; (iv) at least 16 sub-layers; and (v) at least 20 sub-layers.

12. The article of claim 7, wherein the at least two sub-layers include alternating first and second sub-layers, the first sub-layer having a refractive index, Fsref, of between about 1.7-2.0, and the second sub-layer having a refractive index, Ssref, of between about 1.9-2.1.

13. The article of claim 12, wherein a thickness of the first sub-layer is between about 5-30 nm, and a thickness of the second sub-layer is between about 30-400 nm.

14. The article of claim 12, further comprising one of: (i) at least 4 sub-layers; (ii) at least 8 sub-layers; (iii) at least 12 sub-layers; (iv) at least 16 sub-layers; and (v) at least 20 sub-layers.

15. A method of making the article of claim 1 by applying each layer in succession, a first of the layers being disposed on the substrate and subsequent layers being disposed one atop the other.

16. The article of claim 1, wherein the thickness of the intermediate layer is between about 2-3 microns.

* * * * *